United States Patent [19]

Labeye et al.

[11] Patent Number: 5,524,165

[45] Date of Patent: Jun. 4, 1996

[54] METHOD FOR OPTIMIZING A PATH LENGTH OF AN OPTICAL GUIDE AND OPTICAL GUIDE OBTAINED BY SAID METHOD

[75] Inventors: Pierre Labeye, Grenoble, France; François Ladouceur, Canberra, Australia

[73] Assignee: Commissariat A L'Energie Atomique, Paris, France

[21] Appl. No.: 376,489

[22] Filed: Jan. 19, 1995

[30] Foreign Application Priority Data

Jan. 19, 1994 [FR] France ................................. 94 00529

[51] Int. Cl.⁶ .................................................. G02B 6/10
[52] U.S. Cl. .................................................. 385/129
[58] Field of Search ...................... 385/129–133

[56] References Cited

U.S. PATENT DOCUMENTS 4,929,302  5/1990  Valette ........................... 156/657

FOREIGN PATENT DOCUMENTS

0347233A2  12/1989  European Pat. Off. .
0347233    12/1989  European Pat. Off. .
2676808B1  5/1991   France .
3804330A1  8/1989   Germany .
3804330    8/1989   Germany .

OTHER PUBLICATIONS

Chapter 9, "*Pure bend loss & Transition loss,*" Basic relations, Chapter 2, General Configuration (No Date).

L. Lerner, "Minimum Bending Loss Interconnection For Integrated Optics Waveguides," pp. 733–734, Electronics Letters, vol. 29, No. 9 (1993).

Neumann, "*Dielectric Optical Waveguide Tilts with Reduced Losses,*" pp. 9.3-1–9.3-4, 7th ECOC, Copenhagen, (1981).

*Primary Examiner*—Akm E. Ullah
*Attorney, Agent, or Firm*—Burns, Doane, Swecker & Mathis

[57] ABSTRACT

Method for optimizing a path length of an optical guide and optical guide obtained by this method. This method for optimizing an optical guide with a nominal width Po having at any point a variable and continuous curve C and a widening δp with respect to this width Po is characterized in that it comprises a definition stage for widening δp the guide as a variable function f of the curve C, this function δp=f(C) being a continuous function.

20 Claims, 4 Drawing Sheets

METHOD FOR OPTIMIZING A PATH LENGTH OF AN OPTICAL GUIDE AND OPTICAL GUIDE OBTAINED BY SAID METHOD

FIELD OF THE INVENTION

The invention concerns a method for optimizing a path length of an optical guide and an optical guide obtained by this method.

In the invention, an optical guide is understood to be any dielectric structure comprising a refraction index gradient allowing for a bidimensional containment of the light. Examples of this type of structure are given in the document FR-2 625 333. It cites in particular the following structures:
- embodied by a totally or partially etched guiding film inserted between at least two refraction indices smaller than that of the guiding film,
- embodied by a-non-etched guiding film inserted between at least two refraction indices smaller than that of the guiding film, at least one of said indices being partially or totally etched to ensure lateral containment.

Optimization is understood to be the minimization of losses when propagating the light in the path length of the guide connecting two points and involving a deviation of the light with respect to a rectilinear path length.

The light can propagate without losses solely when the path is rectilinear. As soon as the light needs to change direction with the aid of an optical guide, it is necessary to introduce a breakage or curved path length so as to connect the two directions. In the case of a breakage between two rectilinear paths, the losses are proportional to the angle between the two straight segments and are extremely large if the angle exceeds several degrees. In the case of a curved path length, the losses shall be proportional to the curvature (reciprocal value of the radius of curvature) of the path.

The technique for designing optical guides and in particular integrated optical inches consists of minimizing losses due to these curved path lengths whilst preserving a maximum integration level.

The invention can be used in optics, such as integrated optics, and in particular in optical telecommunications applications.

BACKGROUND OF THE INVENTION

From a geometrical point of view, there are two types of methods for minimizing the losses in a curved path length of an optical guide.

One first method was described in detail in the doctorate thesis of E. C. M. Pennings and entitled "Bends in Optical Ridge Waveguides, Modeling and Experiments", Technische Universiteit, Delft, Holland, 1990.

It consists of using curved paths along arcs of circles. A path is then obtained with a constant curvature per portions and the losses per curve can easily be calculated. Moreover, when observing that the luminous intensity maximum of the fundamental mode of the curved guide is offset towards the outer edge of the guide and that its distribution is slightly flattened out, it is possible on each sudden change of curve to offset the centers of the guides so as to recenter the propagation modes and thus reduce the transition losses between two curve discontinuities.

Secondly, it is known that the losses per curve reduce when the width of the guide increases up to a certain limit value, from which a "whispering gallery mode" is reached. Thus, it is possible to improve the losses of the short path by enlarging the guide to this width. The expression "width of the guide"' is understood to be the width of the portion of the guiding structure which ensures the lateral containment of the light; for example, the width of the etched film (i.e. guiding film or adjacent film) in the cases described earlier.

By means of this first method, it is thus possible to obtain a guide with curved portions with a constant width for each portion with an offsetting between the centers of the two neighbouring portions.

A second method consists of using a path length with a continually variable curve, said method being described in the doctorate thesis of F. Ladouceur and entitled "Buried Channel Waveguides and Devices", Australian National University, Canberra, Australia, 1992. Since the sudden curve changes cause transition losses between the various portions of the path, a continually variable curved path length ought to have greater effectiveness as regards transmission of the luminous power.

The path length of the guide is selected from a family of inparametric curves $$x(t) = \sum_{n=0}^{5} a_n t^n \text{ and } y(t) = \sum_{n=0}^{5} b_n t^n,$$

$0<t<L$, the choice of the path length being finally effected by the minimization of a functional.

It ought to be mentioned that this method does not provide for any modification of the width of the guide along the path length.

The major drawback of the first method is that the minimization of losses is carried out by introducing discontinuities which generate transition losses and possibly partial reflections. Therefore, it is intrinsically limited. Secondly, the embodiment of optical guides generally passes through a masking photolithography stage and thus requires that the structure be correctly described on the mask. Now, the embodiment with sufficient accuracy of this type of path length is delicate for a masking device and the method is extremely sensitive to any embodiment imperfection.

The second method is better in that it is generally more flexible and easier to carry out, but as it stands at the current moment, has limited effectiveness in terms of a reduction of the optical losses.

SUMMARY OF THE INVENTION

The present invention is able to resolve these problems and concerns a method for optimizing the path length of an optical guide and an optical guide obtained by this method.

More specifically, it concerns a method for optimizing the path length of an optical guide with a nominal width Po having at any point a variable and continuous curve C and a widening $\delta p$ with respect to this width Po, wherein it comprises a definition stage for widening $\delta p$ of the guide as a variable function f of its curve C, this function $\delta p = f(C)$ being a continuous function.

This method can easily be implemented by normal masking photolithography techniques.

In addition, it can be applied to any optical guide structure, for example the OIS1 and OIS2 structures defined in the document FR-2 676 808.

This method is all the more easy to implement as the widening may be carried out on a single side of the guide and distributed on both sides of the latter.

Since it is able to reduce the luminous power losses inside the guide, this method also is able, as regards a given loss level for a device to be integrated, to obtain improved integration of this device.

The function f preferably satisfies the following condition:

$$\lim_{C \to 0} \frac{f(C)}{C} = k$$

where k is a constant.

More particularly, this function is a linear function of the curve: $f(C)=k.C$.

With this function, the method is particularly simple to implement.

Again more particularly, the coefficient k verifies the inequality $0 \leq k \leq k_{max}$ where $k_{max}$ is the limit value, beyond which a widening would introduce additional optical losses.

The invention also concerns an optical guide obtained by the preceding optimization method.

This guide is an optical guide with a nominal width Po with a variable continuous curve and exhibits at any point a widening $\delta p$ with respect to this width Po, wherein the widening $\delta p$ varies continuously as a function of the curve according to a function $\delta p=f(C)$.

With this variable and continuous widening as a function of the curve, the losses due to the curve diminish. A mode of the guide, offset and compressed owing to the curve, is approximately recentered and widened with respect to the sections of the guide situated "upstream" of the section in question.

This function preferably satisfies the following condition, namely $$\lim_{C \to 0} \frac{f(C)}{C} = k$$

where k is a constant.

In particular, this function is a linear function of the curve: $f(C)=k.C$.

In particular, the coefficient k verifies the inequality $0 \leq k \leq k_{max}$ where $k_{max}$ is the limit value, beyond which a widening would introduce additional optical losses.

BRIEF DESCRIPTION OF THE DRAWINGS

The invention shall be more readily understood by referring to the description of implementation examples given by way of non-restrictive illustration and with reference to the accompanying FIGS. 1 to 10 on which.

DETAILED DESCRIPTION OF THE PREFERRED EMBODIMENTS

Figure 1:
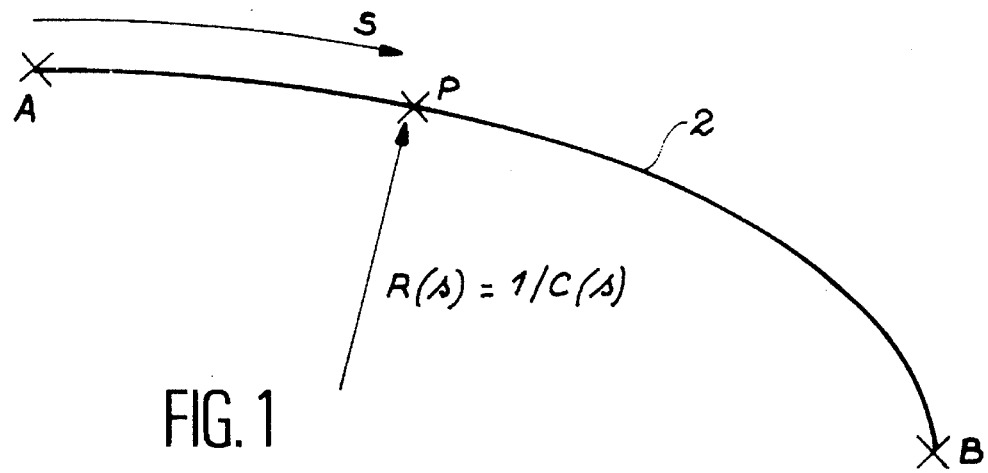
FIG. 1 shows a curvilinear path orientated in space.

Apart from its internal structure (nature of films, dimensioning of films, etc), an optical guide is defined by its geometric path length in space. Thus and as illustrated on FIG. 1, if an optical path length 2 is regarded as moving from a point A to a point B, any point P of the guide shall be defined by a curved abscissa s representing the length of the path traversed to move from A to P. A local bending radius R(S) associated with a local curve $C(s)=1/R(s)$ also corresponds to this point P.

Figures 2A, 2B:
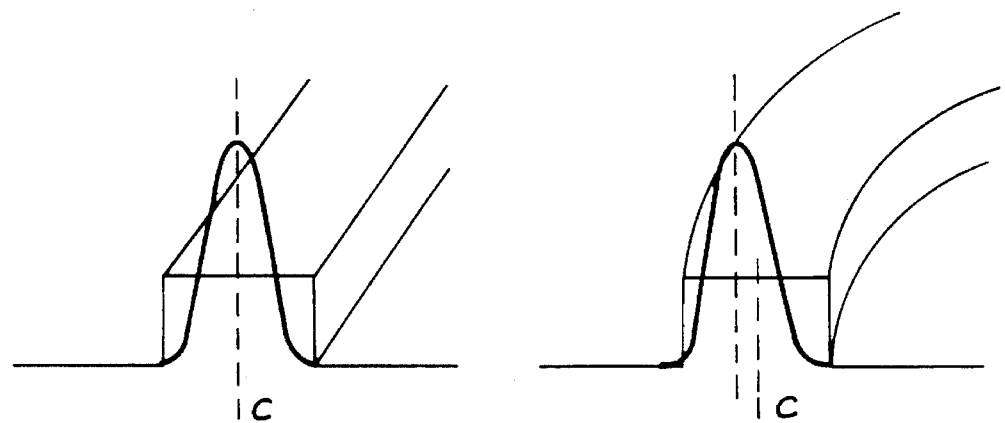
FIGS. 2a and 2b show the phenomenon of offsetting a propagation mode in a curved guide, FIG. 3 (portions a and b) shown the phenomenon of re-aligment of modes when enlarging a guide.

When a guide is curved ($C(s) \neq 0$), the luminous intensity of a mode propagating in this guide slightly gathers towards the outside of the guide, that is on the side opposing the bending center with respect to the center of the guide. The center of the guide is understood to be the lateral position of the intensity maximum of the propagation mode in question in the rectilinear guide. Thus, FIG. 2a represents the distribution of the luminous intensity in a rectilinear guide, that is with a nil curve: the maximum of the intensity defines there the center C of the guide. FIG. 2b represents a curved portion of the same guide and the maximum of the intensity is offset with respect to C on the side opposing the curve.

So as to compensate this offsetting of the modes transmitted by the guide, the invention is able in the case of a continuous curve C(s) (calculated, for example, according to the method described by Ladouceur in the document mentioned earlier) to widen the guide, for example on the side inside the curved path, that is on the side of the curvature center. To widen the guide more precisely implies widening the portion of the guide ensuring the lateral containment.

Figure 3:
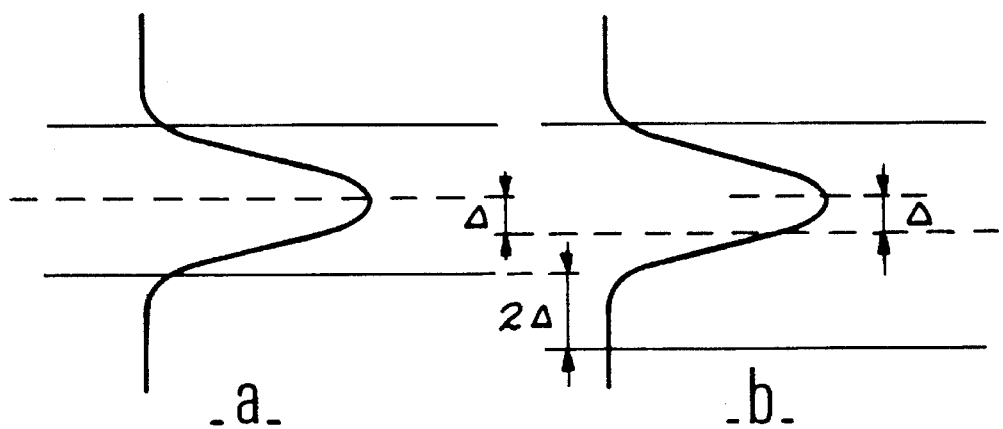

The portions a and b on FIG. 3 show the effect of widening a rectilinear guide concerning the distribution of the intensity of a mode transmitted by this guide. It can be seen that the widening $2\Delta$ creates a displacement of the intensity maximum with respect to the center of the guide, this displacement also being equal to $\Delta$, namely half the total widening, and the intensity maximum of the guide in the widened portion may coincide with the intensity maximum in the non-enlarged portion.

In the case of a guide having a non-nil curve, a widening of the guide (for example with respect to a rectilinear portion which defines, in this case, a nominal width Po), for example on the internal side, shall have the effect of compensating, at least partially, the offsetting effect due to the curve which has been described above (FIG. 2).

Since the guide is a guide with a continuous curve, a widening $\delta p$ according to a continuous function of the curve has also been selected.

A particular case is one where the function $\delta p=f(C)$ may be expressed when C is small compared with the reciprocal value of the width of the guide, as a linear function of the curve:

$$\delta p=f(C)=K.C$$

Which may also be written mathematically:

$$\lim_{C \to 0} \frac{f(C)}{C} = K$$

where K advantageously satisfies the double inequality:

$$0 \leq K \leq K_{max}$$

where Kmax is the value beyond which the widening of the guide would be too large and generate new optical losses (this means that for K1>Kmax, a widening of the type $\delta p = K_1 C$ reintroduces losses). In fact, it is known that the criterion so that a variation of one of the quantities defining a guide (index, thickness, length, etc) does not induce losses is one in which the characteristic length of this variation is large compared with the beating length between two propagation modes ("Optical Waveguide Theory" Snyder and al., Chapman & Hall, 1984 chapter 19).

The characteristic length is defined by:

$$L_c = \frac{Po}{2\frac{dp}{ds}}$$

where Po is a reference width of the guide from which the widening $\delta p$ is defined; Po corresponds to the nominal width of the guide prior to optimization.

As the beating length has a quantity of about $$\frac{\lambda}{n1 - n2}$$

where n1 and n2 are respectively the maximum index and minimum index of this same structure, the condition mentioned above is thus written:

$$Lc \gg \frac{\lambda}{n1 - n2}$$

since $\delta p = K.C(s)$ with $K \leq K_{max}$, by combining these last two equations, the following is obtained:

$$K_{max} = \frac{Po(n1 - n2)}{2\lambda \int_{S_1}^{S_2} \frac{d|C(s)|}{ds} ds}$$

where the integral is defined from S1 to S2, these two curved abscissae delimiting the portion of the guide on which it is desired to calculate $K_{max}$.

By way of example, the parameter K may be obtained by using a gaussian approximation of the distribution of the electric field E in a bent guide with the quantic:

$$E(x) = \left(1 + \Sigma \frac{x}{R}\right) \exp\left(-\frac{(x)^2}{w}\right)$$

where x is the lateral coordinate, R the bending radius, w the half-width (at l/e) of the amplitude of the propagation mode and $\Sigma$ a decentering parameter which may be calculated with the aid of the variational principle:

$$\frac{dI}{d\epsilon} = 0$$

with the given functional I (by approximation) by:

$$I = \frac{\int^{k2} \left[n2(x) + 2n_1^2 \frac{x}{R}\right] E2 - \left(\frac{dE}{dx}\right)^2 dx}{E^2 dx}$$

or $$I = \frac{\int^{k2} \left[n(x)\left(1 + \frac{x}{R}\right)\right]^2 E2 - \left(\frac{dE}{dx}\right)^2 dx}{E^2 dx}$$

where n is the index of the guiding structure. This calculation makes it possible to evaluate $\epsilon$ as a function of the wavelength $\lambda$, the size W and the maximum index of the guiding structure n1. It is then possible to find the position of the maximum of distribution by means of differentiation and the following is obtained:

$$K = \left(\frac{2\pi n_1 w^2}{\lambda}\right)^2$$

This coefficient K and thus the widening are indeed calculated approximately since the propagation mode is not merely offset but also warped in the curved sections. However, this widening has the advantage of moving in the right direction as regards the mechanism of the losses:

the losses per curve reduce with the widening of the guide, the offset mode is approximately recentered with respect to that of the preceding section, the mode is in fact flattened out and thus a widening of the guide rewidens the mode and compensates for the warping with respect to that of the preceding section.

The invention has been explained on the basis of a widening of the internal side of the guide. However, and if the description of the guide is looked at a posterior, this is merely a problem of definition. In fact, the path of the light guide may be defined by:

the center of the guide, the "internal" edge of the guide, the "outer" edge of the guide, the "right" edge of the guide, the "left" edge of the guide, the path of the maximum of the luminous intensity distribution (which is not able to be calculated analytically but only by approximation).

Compared with the orders of magnitude of the parameters involved (widening of about one micron with respect to a luminous path of several millimeters, indeed several centimeters), the widening of the guide may be effected inside the guide, outside the guide or distributed on the two sides.

One method for embodying this guide shall implement the usual techniques for laying films (guiding film and non-guiding films) and using masking photolithography.

Amongst the usual techniques for laying films, there is a plasma-assisted vapor phase chemical depositing technique, especially when this concerns silica films (SiO2), (technique known as the PECVD technique) or other vapor phase chemical depositing methods, such as flame hydrolysis and low pressure vapor phase chemical depositing, especially when this concerns films of silicon nitride (Si3N4) (technology known under the abbreviations LPCVD).

Furthermore, when these films have the same basic constituent, such as silica, so as to have a refraction index difference, one or several or all these films are doped by known methods, including the method using chemical reactions in the presence of reactive gases, ionic implantation and the diffusion of ions or various atoms.

The masking photolithography stage shall be preceded by a stage for defining the widening δp of the guide as a function f of the curve C of the guide, this function δ=f(C) being a continuous function. Advantageously, this function f may possess one of the characteristics already mentioned above for the definition of the guide:

the function satisfies the condition $$\lim_{C \to 0} \frac{f(C)}{C} = K$$

or more particularly the function has the form f(C)=K.C, and/or n either case: $0 \leq K \leq K$ max.

By way of illustration, an example is put forward concerning an optical chicane. An optical chicane may be defined as a curved guide portion connecting two straight parallel but offset guide portions. The optical losses are calculated by the "Beam Propagation Method" whose description appears in the previously mentioned doctorate thesis of F. Ladouceur.

Figure 4:
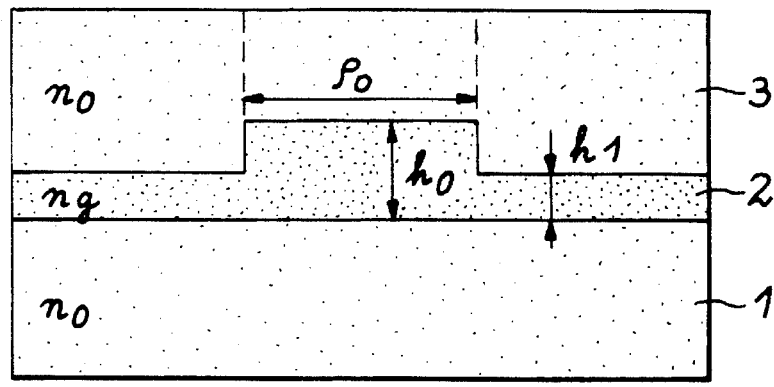
FIG. 4 shows the structure of the section of a guide example.

The simulated type of guide is described on FIG. 4 and corresponds to the structure described in the patent FR-B-2 625 333. This guide includes:

a first silica film 1 doped with 3% phosphorus, index $n_o$=1.46, a second silica film 2 doped with % phophorus, index $n_g$=1.47; this second film is etched, has a central thickness $h_o$=4.5 μm on a width Po=6.5 μm for a lateral thickness $h_l$=2 μm; it is this film which ensures the lateral containment of the light in the guide.

a third film 3 with the identical composition and index as the first one.

Figure 5:
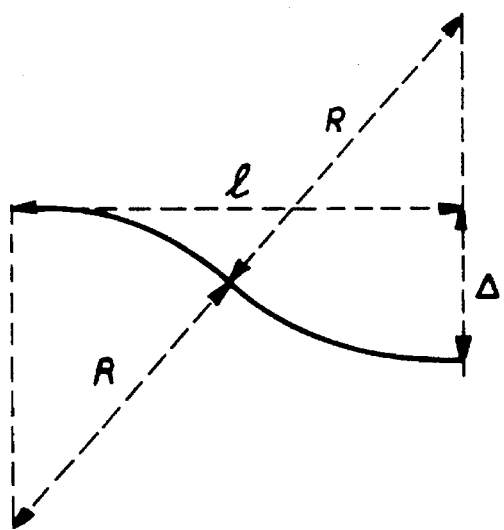
FIG. 5 shows an optical chicane and its various parameters.
Figure 6:
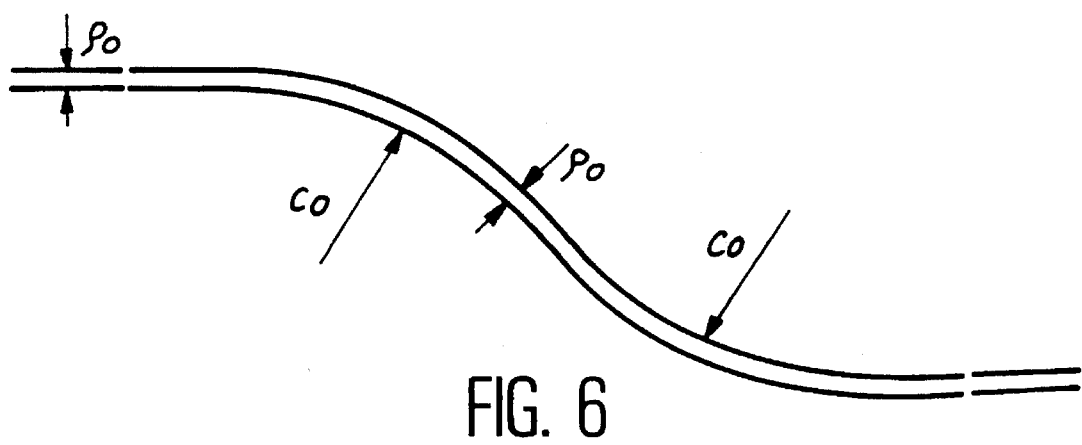
FIG. 6 shows a chicane according to the prior art (case No I)
Figure 7:
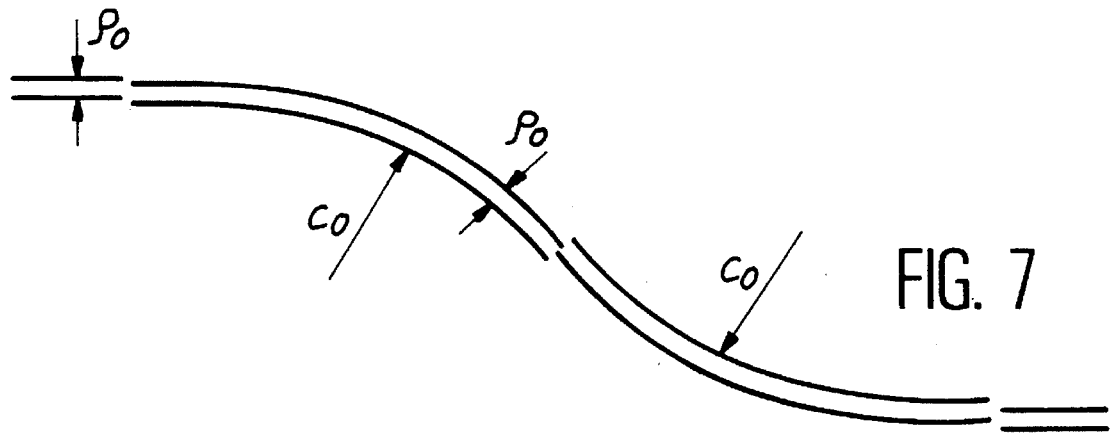
FIG. 7 shows another chicane according to the prior art (case No II)
Figure 8:
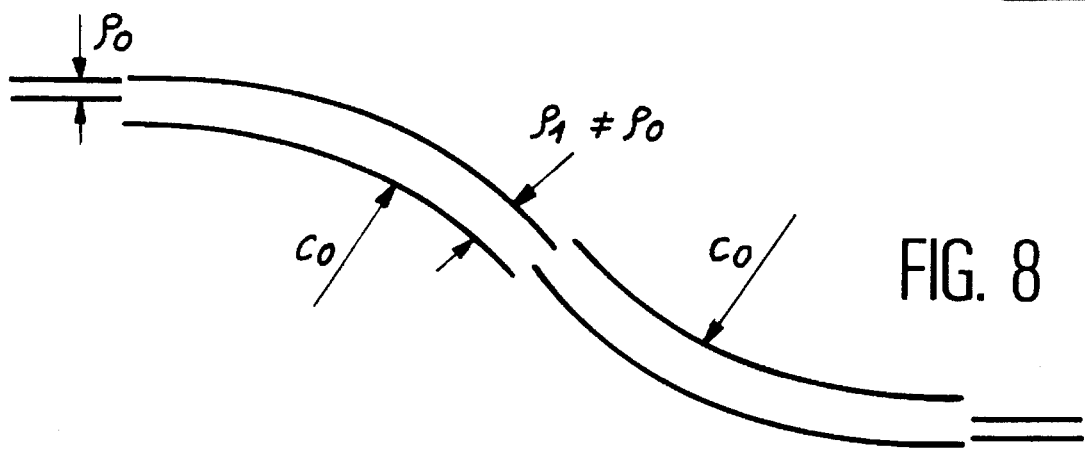
FIG. 8 shows another chicane according to the prior art (case No III)
Figure 9:
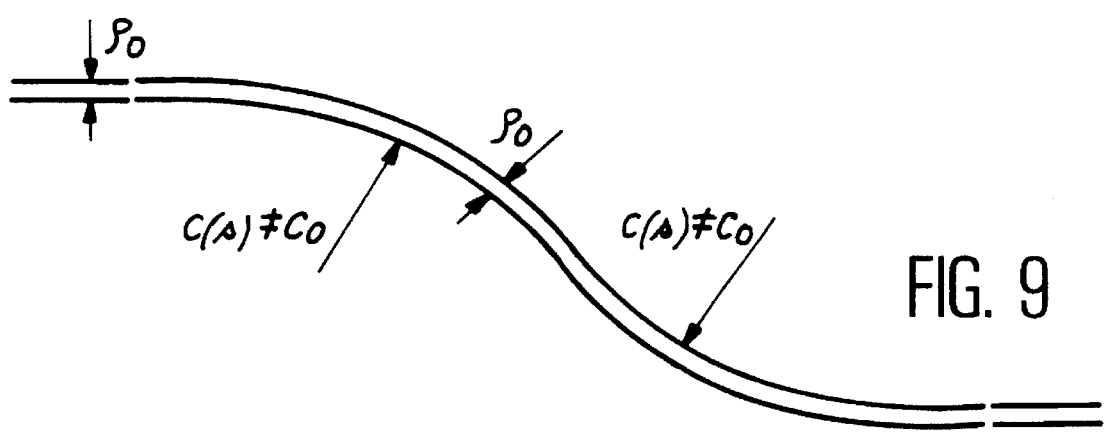
FIG. 9 shows another chicane according to the prior art (case No IV)

The geometry of the chicane is defined on FIG. 5 where the parameters R, Δ and 1 respectively have the following values:

R=15 mm,
Δ=350 μm,
1=4569.19 μm.

Figure 10:
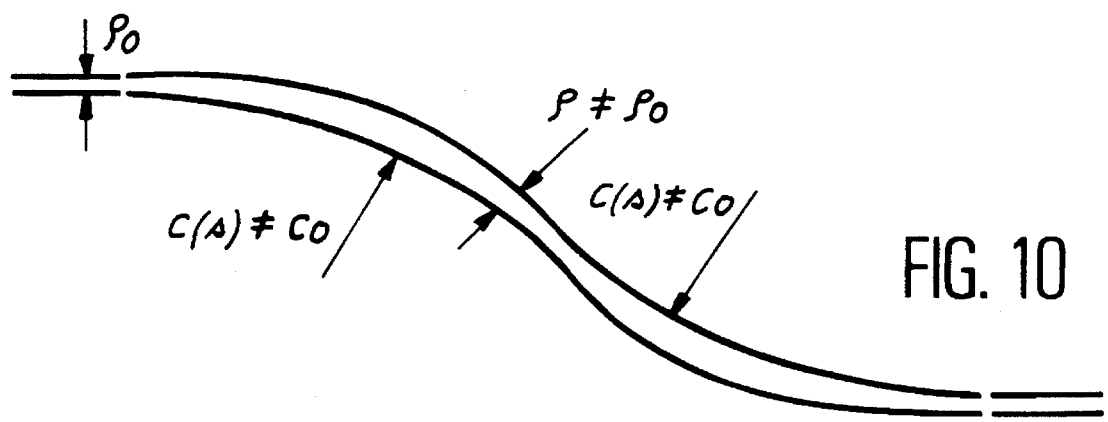
FIG. 10 shows a chicane with an optical guide conforming to the invention.

Five cases have been calculated represented by FIGS. 6 to 10, the case of FIG. 10 corresponding to a guide conforming to the invention:

CASE No I (FIG. 6):

Path of the guide inscribed in arcs of a circle (curve $C_o$ =6.67·10$^{-5}$ μm$^{-1}$), the width $P_o$ of the guide being constant, CASE No II (FIG. 7):

Path of the guide inscribed in arcs of a circle (curve $C_o$=6.67·10$^{-5}$ μm$^{-1}$), width Po of the constant guide, offsetting of guides by 0.55 μm on each change of curve,

CASE NO III (FIG. 8):

Path of the guide inscribed in arcs of a circle (curve $C_o$ =6.67·10$^{-5}$ μm$^{-1}$), offsetting of guides by 0.675 μm on each change of curve, widening of the guide in the curved portions.

CASE No IV (FIG. 9):

Path with variable and continuous curve (C variable between 0 μm$^{-1}$ and $C_{max}$=9.6·10$^{-5}$ μm$^{-1}$), constant guide width (this type of path corresponds to the prior art described by Ladouceur with 5 degree polynomials and a parameter L=3977), CASE No V (FIG. 10):

Path with continuous variable curve (C variable between 0 μm$^{-1}$ and $C_{max}$=9.6·10$^{-5}$ μm$^{-1}$), and with continuous widening of the guide proportional to the curve (f(C)=k.C, with k=23807 μm$^2$ <kmax=5.10$^5$ μm$^2$). The nominal width Po is the width of the rectilinear portion.

In these five cases, the luminous power losses expressed in decibels have been calculated and are listed in the following table:

| Case No | Losses (dB) |
| --- | --- |
| I | 0.43 |
| II | 0.15 |
| III | >0.09 |
| IV | 0.35 |
| V | 0.07 |

According to the results shown in this table, one can clearly see the advantage of the optical guide of the invention. In fact, in the case of the chicane, compared with the most high-performance prior art, the invention provides an improvement of at least 22%

$$\left( \frac{0.02}{0.09} \right)$$

concerning the loss factor.

Figure 11:
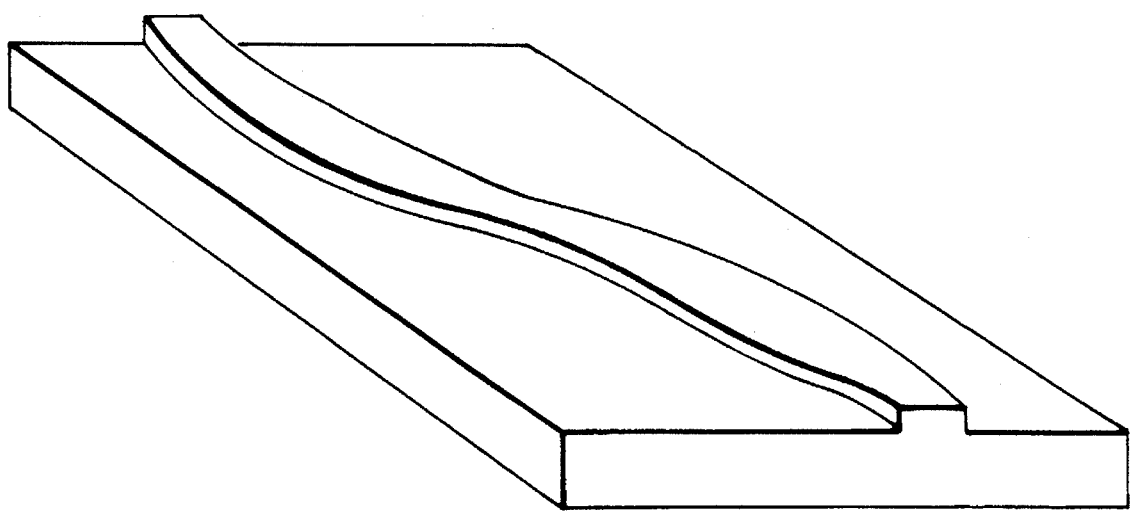
FIG. 11 shows a perspective view of a chicane embodied according to the invention for a particular guide structure.

FIG. 11 represents a perspective view of a chicane conforming to the invention for a particular guide structure. The path may be the one defined in case No V listed above.

More generally, the invention is not merely limited to the optical chicanes but is applicable to any type of integrated optical chip. For example, in the field of optical fiber telecommunications where the integrated optics gradually make their appearance (for example, for wavelength multiplexing), the optical losses of each device are critical and have an affect on the cost for producing and operating such a system. The invention thus proves to be extremely useful in this field.

Secondly, from an industrial point of view, the main interest of each integrated optical chip is its possibility of being bulk-produced. In fact, the chips are produced in parallel on a given substrate and then cut. Each element of progress in reducing the size of these chips are thus of prime importance for the production costs in exactly the same way as in microelectronics. The invention ensuring improved integration as regards losses forms part of this logical approach.

What is claimed is:

1. Method for optimizing the path length of an optical guide with a nominal width Po having at any point a variable continuous curve and a widening with respect to this width Po and comprising a definition stage for widening δp of the guide as a variable function f of the curve C, this function δp=f(C) being a continuous function at any point in the definition stage.

2. Method according to claim 1, the function δp=fC) satisfying the condition:

$$\lim_{C \to 0} \frac{f(C)}{C} = k$$

3. Method according to claim 2, the function f being a linear function of the curve f(C)=k C.

4. Method according to claim 2, the coefficient k satisfying the inequality $0 \leq k \leq kmax$, where kmax is the limit value beyond which a widening would introduce additional optical losses.

5. Optical guide with a nominal width Po having at any point a variable continuous curve C and a widening δp with respect to this width Po, the widening δp being continuously variable at any point as a function of the curve according to a function δp=f(C).

6. Optical guide according to claim 5, the function δp=f(C) satisfying the following condition:

$$\lim_{C \to 0} \frac{f(C)}{C} = k$$

where k is a constant.

7. Optical guide according to claim 6, the function f being a linear function of the curve f(C)=k·C.

8. Optical guide according to claim 6, the coefficient k being such that 0≦k≦kmax where kmax is the limit value beyond which a widening would introduce additional optical losses.

9. Method according to claim 3, the coefficient k verifying the inequality 0≦k≦kmax, where kmax is the limit value beyond which a widening would introduce additional optical losses.

10. Optical guide according to claim 7, the coefficient k being such that 0 ≦k≦kmax where kmax is the limit value beyond which a widening would introduce additional optical losses.

11. An optical device comprising:

at least one optical guide portion where a direction change is required with a nominal width Po having at any point in said portion a continuous curve with a variable curvature C, and a widening δp with respect to this width Po, the widening δp being continuously variable at any point as a function of the curvature C according to a function δp=f(C).

12. An optical device according to claim 11 wherein the function δp=f(C) satisfies the following condition:

$$\lim_{C \to 0} \frac{f(C)}{C} = k$$

where k is a constant.

13. An optical device according to claim 11 wherein the function f is a linear function of the curve f(C)=k·C.

14. An optical device according to claim 12 wherein the coefficient k is such that o≦k≦kmax where kmax is the limit value beyond which a widening would introduce additional optical losses.

15. An optical device according to claim 13 wherein the coefficient k is such that o≦k≦kmax where kmax is the limit value beyond which a widening would introduce additional optical losses.

16. An optical device comprising:

at least one optical guide having at least one segment with a variable continuous curvature C and a nominal width Po where the nominal width is widened δp at least in the segment with a continuous variable curvature C, said widening being a continuous function of the curvature C, δp=f(C).

17. An optical device according to claim 16 wherein the function δp=f(C) satisfies the following condition:

$$\lim_{C \to 0} \frac{f(C)}{C} = k$$

where k is a constant.

18. An optical device according to claim 17 wherein the function f is a linear function of the curve f(C)=k.C.

19. An optical device according to claim 17 wherein the coefficient k is such that o≦k≦kmax where kmax is the limit value beyond which a widening would introduce additional optical losses.

20. An optical device according to claim 18 wherein the coefficient k is such that o≦k≦kmax where kmax is the limit value beyond which a widening would introduce additional optical losses.

* * * * *